United States Patent
Weichenberger et al.

(10) Patent No.: US 7,359,779 B2
(45) Date of Patent: Apr. 15, 2008

(54) METHOD FOR THE EVALUATION OF THE MOUNTING LOCATION OF AN ACCELERATION SENSOR COMPONENT IN A VEHICLE

(75) Inventors: Lothar Weichenberger, Klingsmoos (DE); Richard Baur, Pfaffenhofen (DE); Helmut Steurer, Gerolsbach-Junkenhofen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 687 days.

(21) Appl. No.: 10/501,982

(22) PCT Filed: Jan. 14, 2003

(86) PCT No.: PCT/DE03/00082

§ 371 (c)(1),
(2), (4) Date: Jul. 14, 2004

(87) PCT Pub. No.: WO03/059696

PCT Pub. Date: Jul. 24, 2003

(65) Prior Publication Data

US 2005/0131594 A1 Jun. 16, 2005

(30) Foreign Application Priority Data

Jan. 17, 2002 (DE) ................. 102 01 551

(51) Int. Cl.
*B60R 22/00* (2006.01)
(52) U.S. Cl. .......... 701/45; 701/29; 701/35; 701/46; 701/47; 180/271; 280/735
(58) Field of Classification Search .......... 701/45, 701/46, 47, 29, 35; 180/268, 271; 280/734, 280/735
See application file for complete search history.

(56) References Cited

U.S. PATENT DOCUMENTS

| | | | |
|---|---|---|---|
| 5,073,860 | A | 12/1991 | Blackburn et al. |
| 5,164,901 | A | 11/1992 | Blackburn et al. |
| 5,185,701 | A | 2/1993 | Blackburn et al. |
| 5,506,454 | A | 4/1996 | Hanzawa et al. |
| 5,526,687 | A | 6/1996 | Ueyanagi |
| 2003/0034194 | A1 | 2/2003 | Roelleke et al. |

FOREIGN PATENT DOCUMENTS

| | | |
|---|---|---|
| DE | 3828968 | 3/1990 |
| DE | 4034974 | 5/1991 |
| DE | 4241135 | 6/1993 |
| DE | 4316263 | 11/1993 |
| DE | 4419267 | 12/1994 |
| DE | 19757118 | 7/1999 |
| DE | 19900327 | 7/2000 |
| DE | 19939984 | 3/2001 |
| DE | 10042376 | 10/2001 |
| JP | 05 273232 | 10/1993 |
| JP | 05273232 | 10/1993 |

*Primary Examiner*—Gertrude A. Jeanglaude
(74) *Attorney, Agent, or Firm*—W. F. Fasse; W. G. Fasse

(57) ABSTRACT

Method for the evaluating of an installation location of an acceleration sensor assembly in a vehicle with respect to the transmission characteristics to this installation location of acceleration impulses acting on the vehicle, with a following serially-connected evaluating circuit, especially for the triggering of occupant protection devices, in that a prescribed acceleration impulse is impressed at at least one prescribed position on the vehicle, the impulse response is measured at the installation location, the frequency spectrum of the impulse response is determined, and the installation location is evaluated through comparison of this frequency spectrum with a prescribed nominal spectrum.

15 Claims, 2 Drawing Sheets

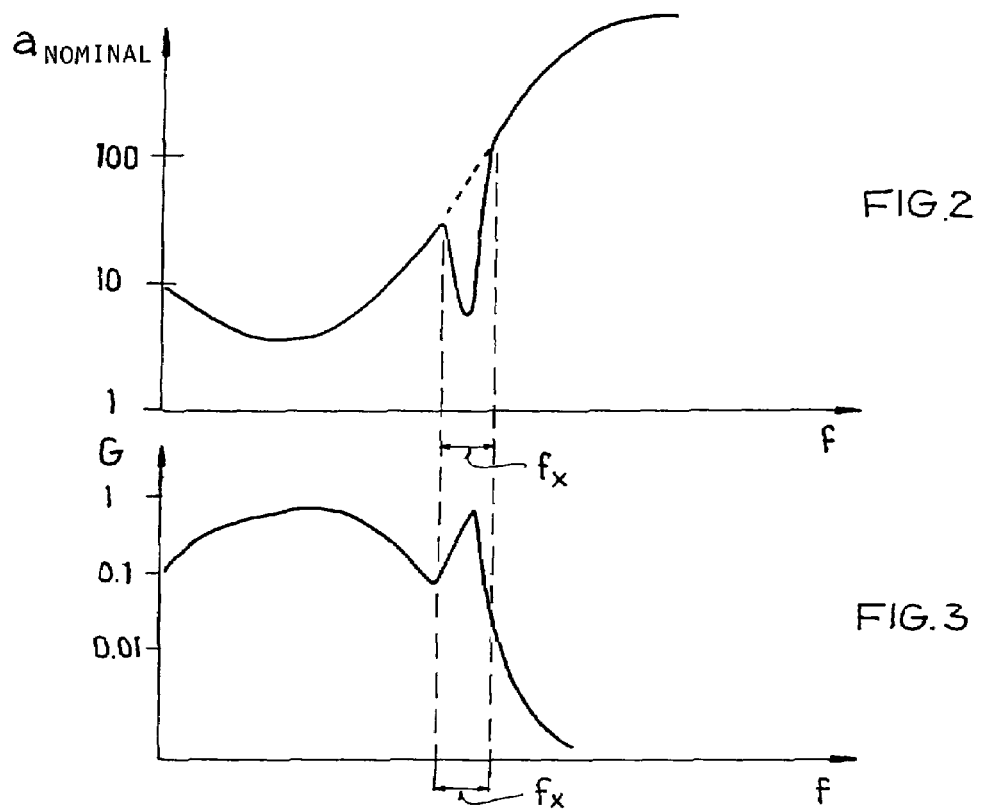
FIG.2
FIG.3
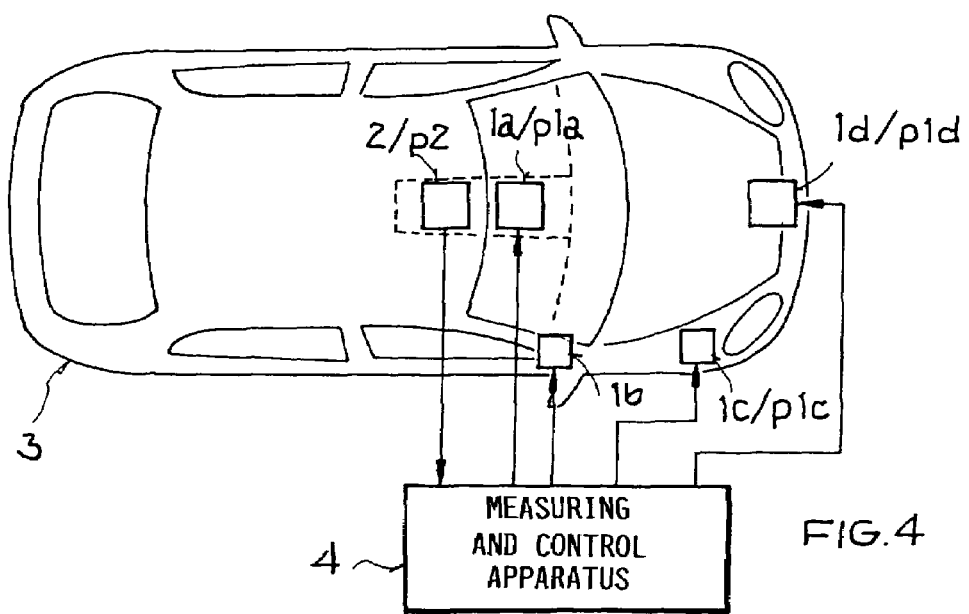
FIG.4

METHOD FOR THE EVALUATION OF THE MOUNTING LOCATION OF AN ACCELERATION SENSOR COMPONENT IN A VEHICLE

FIELD OF THE INVENTION

The invention relates to a method for the evaluating of an installation location of an acceleration sensor assembly in a vehicle with respect to the transmission characteristics to this installation location of acceleration impulses acting on the vehicle, with a following serially connected evaluating circuit, especially for the triggering of occupant protection devices.

BACKGROUND INFORMATION

Methods for the triggering of occupant protection systems dependent on acceleration signals are known in great numbers, whereby therein, in addition to the amplitude of the acceleration signal, also the frequency spectrum thereof is already taken into account in the evaluation, as can be seen, for example, from the U.S. Pat. No. 5,073,860 or the DE 40 34 974 A1.

Due to the early triggering of the occupant protection systems necessary for the occupant safety, a decision must be made about the triggering relatively early in the course of an accident. The triggering thresholds are therefore relatively low and can be reached unfortunately also by interference signals, as they arise with an uneven roadway, contacts of a lateral roadway curb or the like. In that regard, especially the vehicle itself acts in an interfering manner due to its spring suspension and the self-resonance or eigenresonance of individual parts. Especially it is to be determined, that erroneous triggerings of the occupant protection system came about due to such interfering signals despite the fulfillment of prescribed specifications by the acceleration sensor assemblies after their installation in certain vehicles.

SUMMARY OF THE INVENTION

It is therefore an object of the invention to offer, to the vehicle manufacturers as well as the manufacturers of the occupant protection systems, a method by which such interfering signal influences can be recognized.

The above object has been achieved according to the invention in a method for the evaluating of an installation location of an acceleration sensor assembly in a vehicle with respect to the transmission characteristics to this installation location of acceleration impulses acting on the vehicle, with a following serially-connected evaluating circuit, especially for the triggering of occupant protection devices, a) in which a prescribed acceleration impulse is impressed at at least one prescribed position on the vehicle, the impulse response is measured at the installation location, b) the frequency spectrum of the impulse response is determined, c) and the installation location is evaluated through comparison of this frequency spectrum with a prescribed nominal spectrum.

Therefore, there is proposed a method for the evaluating of an installation location of an acceleration sensor assembly in a vehicle with respect to the transmission characteristics to this installation location of acceleration impulses acting on the vehicle.

For this purpose, an acceleration impulse is impressed or imposed on one and preferably several prescribed positions on the vehicle, the impulse response is measured at the installation location, the frequency spectrum of the impulse response is determined, and the installation location is evaluated through comparison of this frequency spectrum with a prescribed nominal (or rated or desired reference) spectrum.

Preferably, a group of acceleration impulses that are harmless as to safety, for which no triggering of occupant protection devices is necessary, is impressed, whereby the installation location is evaluated regarding to what extent the frequency spectra of the impulse responses to these safety-harmless impulse signals do not exceed the prescribed nominal spectrum, as well as additionally a group of safety-critical acceleration impulses, for which a triggering of occupant protection devices is necessary, is impressed, whereby the installation location is evaluated regarding to what extent the frequency spectra of the impulse responses to these safety-critical impulse signals exceed the prescribed nominal spectrum.

In that regard, the nominal spectrum to be prescribed is of special importance and is preferably determined from:

a) the frequency response characteristic of the sensor of the acceleration sensor assembly that is to be installed at the installation location, and b) the frequency response characteristic of the mechanical components of the sensor assembly, and c) a characteristic of the following serially-connected evaluating circuit.

In order to further increase the quality of the determination or proposition of the evaluation of the installation location, subsequently the acquired impulse response can be weighted with a prescribed weighting function in a second method step, and subjected to the evaluating algorithm to be carried out in the evaluating circuit, which corresponds to a simulation of the reaction of the evaluating circuit to the prescribed acceleration impulse.

The special advantage of this method is that it can run or proceed fully automatically after the prescribing of the parameters, and thus a plurality of various different acceleration impulses can be impressed and the corresponding impulse responses can be detected or acquired, in order to be statistically summarized to an overall or total evaluation through corresponding evaluation factors that are oriented or directed according to the peculiarities of the respective acceleration impulse.

Especially advantageous is also the use of a norm or standard signal, especially a pseudo-random signal, of which the impulse response, due to the special characteristics, can detect the entire or total transmission characteristic of the vehicle at this installation location with one or at least a few signals through auto-correlation with the impressed norm signal.

In that context, the method for the evaluating of an installation location of an acceleration sensor assembly can be carried out both on the real vehicle with real impression of acceleration impulses as well as with a vehicle simulation program on a data processing system. An advantage of this simulation is that particularly also in the range of acceleration impulses of higher amplitude, the associated deformation of corresponding vehicles is avoided, as has already been developed in the prior art in the field of crash analysis. In the present case, however, it does not relate to the evaluation of the vehicle frame or body deformation, but rather the further conduction of the previously introduced acceleration impulse to the installation location. The method, however, basically has its primary focus rather in the field of recognition of undesired influences of interfering signals at the installation location, i.e. in the so-called misuse-area, because here the linearity of the transmission function is also still ensured.

BRIEF DESCRIPTION OF THE DRAWINGS

In the following, the invention shall be described in further detail in connection with example embodiments and figures. Short description of the figures:

FIG. 2 nominal spectrum at the installation location;

FIG. 3 weighting function on the basis of the nominal spectrum;

FIG. 4 experimental construction with a plurality of positions for the impression of acceleration impulses.

DETAILED DESCRIPTION OF PREFERRED EXAMPLE EMBODIMENTS OF THE INVENTION

Figure 1:
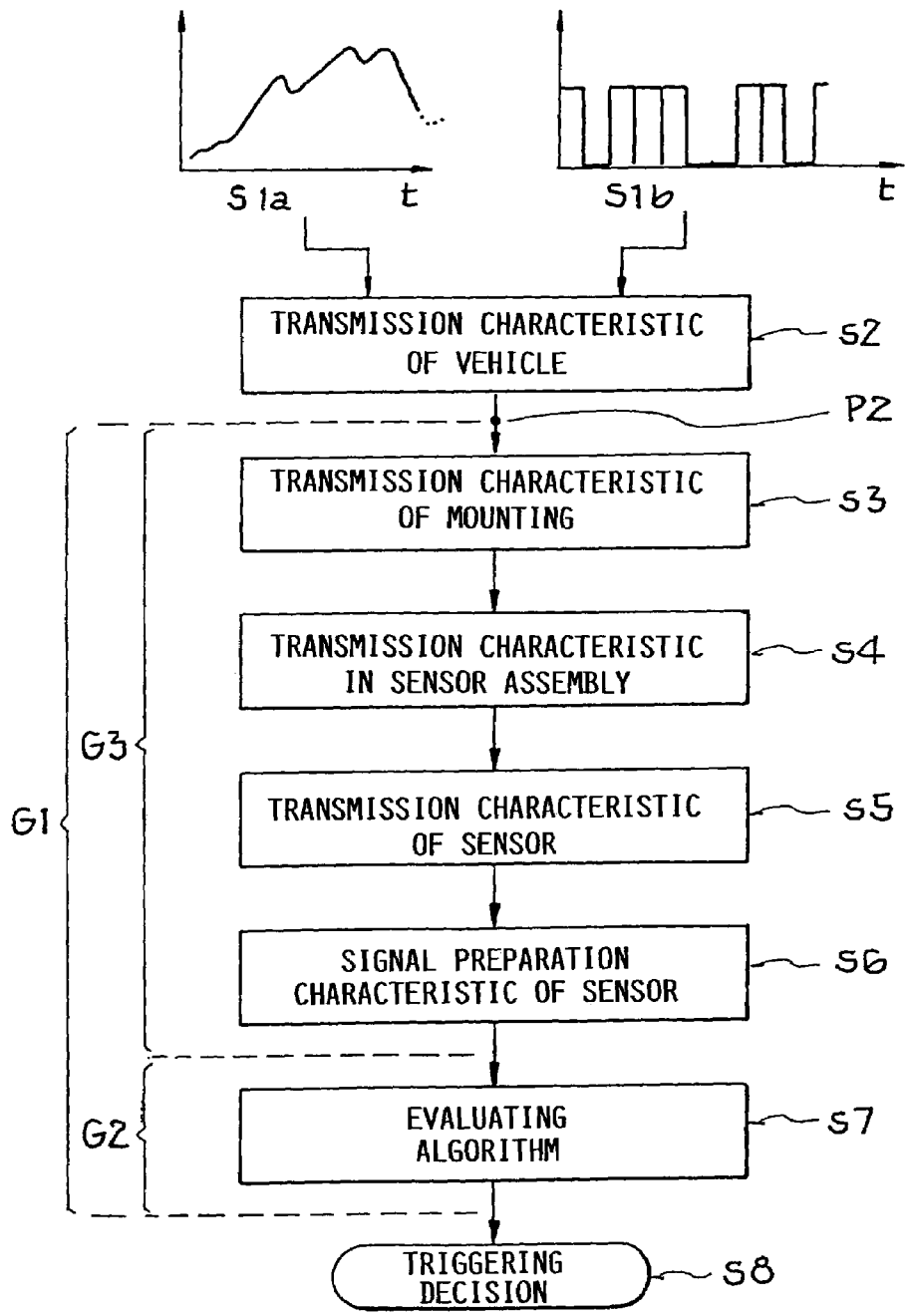
FIG. 1 influence factors on the signal transmission up to the triggering decision.

The FIG. 4 sketches an experimental construction with a plurality of positions p1$a$, p1$b$, . . . for the impression of acceleration impulses for example by means of vibrators, hammering apparatus or comparable apparatus 1$a$, 1$b$. . . . Also conceivable is the use of a shaking table on which the vehicle 3 is secured. The sensor assembly 2 provided for the series or mass production, or a sensor arrangement especially preferred for the experimental construction, can be provided at the installation location p2.

For the method described in this example embodiment, real acceleration signals s1 are impressed on the vehicle 3. In this context, acceleration signals s1$a$ with a natural characteristic, especially safety-harmless acceleration impulses, for which no triggering of occupant protection devices is necessary, as well as at least in a limited amplitude, safety-critical acceleration impulses, for which a triggering of occupant protection devices is necessary, can be impressed. Alternatively or as a supplement, moreover the impression of broadband norm or standard signals s1$b$, especially white noise or a pseudo-random sequence, for example an MLS-sequence is conceivable, the advantages of which shall be discussed later in further detail.

During the impression of acceleration impulses at the positions p1$a$, p1$b$ . . . , the impulse responses arriving at the installation location p2 are measured, the frequency spectrum of the impulse response is determined by means of the measuring and control apparatus 4, and the installation location is evaluated through comparison of this frequency spectrum with a prescribed nominal spectrum with consideration of the impressed acceleration impulse.

FIG. 1 functionally sketches the path from the impression of an acceleration signal up to the triggering decision, and therewith the influence factors on the signal transmission.

First, the transmission characteristic s2 of the vehicle from the location of the impression to the installation location of the sensor, which transmission characteristic s2 is actually determinative for the evaluation, is to be specified. This is sharply dependent on the vehicle type and the selected installation location. For the prespecification of a nominal spectrum, however, it requires consideration of the total transmission path finally up to the triggering decision s8.

Therebetween, there are further influence factors that shall also be taken into consideration. Thus, the transmission characteristic s3 directly at the installation location, i.e. the transition from the motor vehicle body to the sensor assembly, is to be specified, which is dependent on the selected form of the housing of the sensor assembly and the installation or mounting technique, especially the stiffness of the connection.

The signal transmission characteristic s4 in the sensor assembly itself, from the housing of the assembly to the actual sensor element, also has an unfortunately extremely critical influence, because the circuit board in the sensor assembly can comprise an eigenfrequency that is possibly critical in the decision-significant range.

Moreover, the transmission characteristic s5 of the sensor itself, i.e. its conversion of the impulse into an electrical signal, as well as also the signal preparation characteristic s6 of the sensor, i.e its damping behavior, possible influences of the A/D conversion of the signal, etc. are also to be taken into consideration.

Finally, also the actual evaluating algorithm s7 is to be added, which makes the triggering decision s8, i.e. the evaluation regarding the triggering or not-triggering, based on the measured acceleration signal. In that regard, certain frequency components are strongly effective for the evaluating algorithm, and others are not. The problem in that regard is that this does not strictly and necessarily correspond with which frequency components are also significant for the triggering decision and which are not.

The evaluating algorithm of the evaluating circuit generally includes an integration of the acceleration impulses over time windows, so that preferably in the evaluation of the installation location, a comparison of the impulse response that has been weighted and integrated over this time window with a nominal integration value for the respective impressed acceleration impulse is carried out.

For an evaluation that is as exact as possible, these influence factors must therefore be taken into consideration. For this purpose, for the method, for example a special sensor arrangement can be used at the installation location p2, for which the influences of the sensor arrangement on the signal transmission is quite small, i.e. the corresponding weighting function G3 (see FIG. 1) is approximately constant 1 or at least linear. The nominal spectrum $a(f)_{nominal}$ prescribed for the comparison with the frequency spectrum $a(f)_{actual}$ of the impulse response must then take into consideration the various different influence factors of the following or subsequent signal transmission path. Thus, the nominal spectrum $a(f)_{nominal}$ will particularly not comprise the ideal typical progression or curve of a transmission characteristic, but instead significant deviations, which are based on the specifics of the influence factors, in certain frequency ranges fx. Eigenfrequency influences, effects of the A/D converter, as well as also a possibly undesired strong total damping go into the prescribed nominal spectrum $a(f)_{nominal}$. This can be simulated or derived from the signals. Moreover, the nominal spectrum is dependent on the direction of the impression of the acceleration impulse and the sensitive direction of the sensor. Thus, for a sensor assembly, preferably separate nominal spectra are prescribed in the driving direction and in the transverse direction.

In connection with the use of a special sensor in the experimental construction, these influence factors can be replaced by a weighting function G1 (compare FIGS. 1 and 3), which is derived from the nominal spectrum $a(f)_{nominal}$, approximately corresponding to the reciprocal (in this regard compare FIGS. 2 and 3).

If the sensor arrangement used in that context is also not free of influences, then correspondingly the transmission characteristic of the experimental sensor would have to be used instead of the component G3 of the sensor to be used in the series production.

Moreover, the use of the series construction of the sensor assembly is considered, because this inherently has the majority of the already addressed influence factors, so that a comparison of its output signal spectrum with the nominal spectrum, which then naturally looks different, is carried out. In this case, the nominal spectrum will primarily represent the influence of the evaluating algorithm, which is sketched as G2 in FIG. 1.

For an overall or total evaluation of the installation location, preferably a plurality of various different acceleration impulses (s1a in FIG. 1) that are to be expected in the operation of the vehicle, especially safety-harmless acceleration impulses, possibly also safety-critical acceleration impulses are impressed at various different impact points of the vehicle, and the installation location is evaluated regarding to what extent the frequency spectra of the impulse responses to these safety-harmless impulse signals do not exceed the prescribed nominal spectrum $a(f)_{nominal}$, and on the other hand the frequency spectra of the impulse responses to these safety-critical impulse signals exceed the prescribed nominal spectrum $a(f)_{nominal}$. Especially preferably, a broadband norm or standard signal sib, especially a white noise or a pseudo-random sequence, such as a maximum length sequence (MLS-sequence), is impressed on the vehicle, the impulse response measurable at the installation location p2 is measured, the transmission characteristic is determined therefrom by means of a Fast-Fourier-Transformation and is compared with a prescribed nominal characteristic $a(f)_{nomianal}$. Since the nominal characteristic $a(f)_{nominal}$ for these signals is known, on the other hand, based thereon the transmission characteristic can also be calculated directly in the sensor (G3 in FIG. 1) as well as in the vehicle (s2). Maximum length sequences in that context are binary sequences of the length $n=2^m-1$, of which the autocorrelation function is described by $p(0)=1$, $p(i)=-1/n$ for $1 \leq i \leq n-1$.

This can especially also be taken as a starting point, in order to first specify the nominal spectrum in greater detail in a first run in connection with this broadband norm or standard signal s1b, to derive the weighting function, and subsequently to evaluate the installation location in greater detail in connection with real typical acceleration signals.

Moreover the norm or standard signal s1b can also be impressed directly at the installation location p2 of the acceleration sensor assembly, and the components reflected in the vehicle can be evaluated while screening or filtering out the direct input coupling.

Moreover, by means of this method, data can be obtained, that are input into a software technical method in which a vehicle simulation program that can be carried out on a data processing system is provided, to which acceleration impulses at prescribed impact points on the vehicle are prescribed, and the impulse responses at the installation location are simulated by means of the vehicle simulation program, and the installation location is evaluated through comparison of the frequency spectrum of the simulated impulse responses with a prescribed nominal spectrum.

In the end result, the transmission behavior can be determined for a plurality of potentially possible installation locations, and vehicle specific critical installation locations with strong interference susceptibility, i.e. critical frequency spectra near or even partially over the nominal spectrum for non-safety-critical acceleration impulses, can be recognized. Over the plurality of acceleration signals, an averaging or a weighting can be carried out for obtaining an overall or total evaluation. The total evaluations of all acceleration signals for an installation location are systematically repeated for several installation locations, and thereby an overview regarding the potential installation locations in the vehicle is obtained overall.

The invention claimed is:

1. Method of evaluating an installation location (p2) of an acceleration sensor assembly (2) in a vehicle (3) with respect to transmission characteristics to the installation location (p2) of acceleration impulses (s1a, s1b) acting on the vehicle (3), with a following serially-connected evaluating circuit (s7), especially for triggering (s8) occupant protection devices,
   a) in which a prescribed acceleration impulse (s1a, s1b, . . . ) is impressed at at least one prescribed position (p1a, p1b, . . . ) on the vehicle to produce an impulse response, the impulse response is measured at the installation location,
   b) a frequency spectrum $(a(f)_{actual})$ of the impulse response is determined,
   c) and the installation location (p2) is evaluated through comparison of the frequency spectrum with a prescribed nominal spectrum $(a(f)_{nominal})$.

2. Method according to claim 1, in which a broadband norm signal (s1b), especially a white noise or a pseudo-random sequence, is impressed on the vehicle, the impulse response measurable at the installation location (p2) is measured, therefrom a transmission characteristic is determined via a Fast-Fourier-Transformation and compared with a prescribed nominal characteristic $(a(f)_{nominal})$.

3. Method according to claim 2, wherein the norm signal is impressed at various different impact points on the vehicle, and the transmission characteristics of the various different impact points are compared with the nominal characteristic and additionally with one another.

4. Method according to claim 2, wherein the norm signal (s1b) is impressed at the installation location (p2) of the acceleration sensor assembly, and components reflected in the vehicle are evaluated while screening out a direct input coupling.

5. Method according to claim 2, wherein one or more maximum length sequences (MLS-sequences) are used as the norm signal (s1b).

6. Method according to claim 1, in which a plurality of various different acceleration impulses (s1a) to be expected during operation of the vehicle are impressed at various different impact points of the vehicle.

7. Method according to claim 6, in which a group of safety harmless acceleration impulses, for which no triggering of occupant protection devices is necessary, are impressed, wherein the installation location is evaluated regarding to what extent frequency spectra of the impulse responses to the safety-harmless acceleration impulses do not exceed the prescribed nominal spectrum $(a(f)_{nominal})$.

8. Method according to claim 7, wherein additionally a group of safety-critical acceleration impulses, for which a triggering of occupant protection devices is necessary, are impressed, wherein the installation location is evaluated regarding to what extent frequency spectra of the impulse responses to the safety-critical acceleration impulses exceed the prescribed nominal spectrum $(a(f)_{nominal})$.

9. Method according to claim 6, in which additionally a frequency response characteristic of a sensor used for the measurement of the impulse response directly at the installation location is taken into consideration.

10. Method according to claim 6, wherein impulse responses to the various different acceleration impulses that are to be expected during operation of the vehicle, which impulse responses are measurable at the installation location, are weighted with a weighting function (G) and provided to the following serially-connected evaluating circuit, wherein the evaluating circuit generates corresponding output signals from the impulse responses respectively corresponding to a prescribed evaluating algorithm, and in the evaluation of the installation location, additionally, a comparison of the output signals with nominal output signals respectively prescribed for the acceleration impulses is carried out.

11. Method according to claim 10, wherein the weighting function (G) is derived from the reciprocal of the nominal spectrum $(a(f)_{nominal})$.

12. Method according to claim 10, wherein the evaluating algorithm of the evaluating circuit includes an integration of the respective acceleration impulse over a time window, and in the evaluation of the installation location, a comparison of the impulse response, which is weighted and integrated over this time window, with a nominal integration value for the respective acceleration impulse is carried out.

13. Method according to claim 1, wherein the nominal spectrum $(a(f)_{nominal})$ is determined from:
   a) a frequency response characteristic of a sensor of the acceleration sensor assembly that is to be installed at the installation location and
   b) a frequency response characteristic of mechanical components of the sensor assembly and
   c) a characteristic of the following serially-connected evaluating circuit.

14. Method for evaluating an installation location of an acceleration sensor assembly in a vehicle with respect to transmission characteristics to this installation location of acceleration impulses acting on the vehicle, with a following serially-connected evaluating circuit, especially for triggering occupant protection devices,
   a) wherein a vehicle simulation program that can be carried out on a data processing system is provided,
   b) to which acceleration impulses are prescribed at prescribed impact points on the vehicle,
   c) by means of the vehicle simulation program, impulse responses at the installation location are simulated, and the installation location is evaluated through comparison of a frequency spectrum of simulated impulse responses with a prescribed nominal spectrum.

15. Method according to claim 14, wherein the vehicle simulation program is based on the real transmission characteristics determined according to a method for evaluating the installation location (p2) of the acceleration sensor assembly (2) in the vehicle (3) with respect to the real transmission characteristics to this installation location (p2) of real acceleration impulses (s1a, s1b) acting on the vehicle (3), with the following serially-connected evaluating circuit (s7), especially for triggering (s8) the occupant protection devices,
   a) in which a prescribed real acceleration impulse (s1a, s1b, . . . ) is impressed at at least one prescribed position (p1a, p1b, . . . ) on the vehicle to produce a real impulse response, the real impulse response is measured at the installation location,
   b) a real frequency spectrum $(a(f)_{actual})$ of the real impulse response is determined,
   c) and the installation location (p2) is evaluated through comparison of the real frequency spectrum with a prescribed nominal spectrum $(a(f)_{nominal})$
   wherein a broadband norm signal (s1b), especially a white noise or a pseudo-random sequence, is impressed on the vehicle, the impulse response measurable at the installation location (p2) is measured, therefrom the real transmission characteristic is determined via a Fast-Fourier-Transforation and compared with a prescribed nominal characteristic $(a(f)_{nominal})$.

* * * * *

UNITED STATES PATENT AND TRADEMARK OFFICE
CERTIFICATE OF CORRECTION

PATENT NO. : 7,359,779 B2 Page 1 of 1
APPLICATION NO. : 10/501982
DATED : April 15, 2008
INVENTOR(S) : Weichenberger et al.

It is certified that error appears in the above-identified patent and that said Letters Patent is hereby corrected as shown below:

Column 3,
Line 25, after "1a,", replace "1b." by --1b,--;

Column 4,
Line 54, after "trum", replace "a (f)$_{nominal}$" by --a(f)$_{nominal}$--;

Column 5,
Line 24, after "(a(f)$_{nominal}$).", insert a paragraph break;
Line 25, after "signal", replace "sib" by --s1b--;
Line 32, after "characteristic", replace "a(f)$_{nomianal}$" by --a(f)$_{nominal}$--;

Column 6,
Lines 50 and 51, after "of", replace "safety harmless" by --safety-harmless--;

Column 8,
Line 29, after "(a(f)$_{nominal}$)", insert --,--;
Line 35, after "via a", replace "Fast-Fourier-Transforation" by
--Fast-Fourier-Transformation--.

Signed and Sealed this

Twenty-first Day of July, 2009

JOHN DOLL
*Acting Director of the United States Patent and Trademark Office*